(12) United States Patent
Ide et al.

(10) Patent No.: US 12,504,836 B2
(45) Date of Patent: *Dec. 23, 2025

(54) POSITION INDICATING DEVICE AND SPATIAL POSITION INDICATING SYSTEM

(71) Applicant: Wacom Co., Ltd., Saitama (JP)

(72) Inventors: Yuichi Ide, Saitama (JP); Hiroshi Tamano, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/794,958

(22) Filed: Aug. 5, 2024

(65) Prior Publication Data

US 2024/0393891 A1 Nov. 28, 2024

Related U.S. Application Data

(63) Continuation of application No. 18/167,006, filed on Feb. 9, 2023, now Pat. No. 12,073,032, which is a continuation of application No. 16/951,713, filed on Nov. 18, 2020, now Pat. No. 11,604,520, which is a continuation of application No. PCT/JP2019/015043, filed on Apr. 4, 2019.

(30) Foreign Application Priority Data

May 21, 2018 (JP) .................. 2018-096936

(51) Int. Cl.
 G06F 3/0354 (2013.01)
 G06F 3/01 (2006.01)
(52) U.S. Cl.
 CPC .......... G06F 3/03545 (2013.01); G06F 3/011 (2013.01); G06F 3/016 (2013.01)

(58) Field of Classification Search
 CPC ....... G06F 3/03545; G06F 3/011; G06F 3/016
 See application file for complete search history.

(56) References Cited

U.S. PATENT DOCUMENTS

| 5,694,013 A | 12/1997 | Stewart et al. |
| 5,844,392 A | 12/1998 | Peurach et al. |
| 8,866,739 B2 | 10/2014 | Tsuboi et al. |
| (Continued) | | |

FOREIGN PATENT DOCUMENTS

| CN | 112074802 A | 12/2020 |
| JP | 2003085590 A | 3/2003 |
| (Continued) | | |

OTHER PUBLICATIONS

Machine translation of JP 20100225335 (Year: 2025).*

(Continued)

*Primary Examiner* — Michael Pervan
(74) *Attorney, Agent, or Firm* — Seed Intellectual Property Law Group LLP

(57) ABSTRACT

A position indicating device includes a housing in which an electronic pen including a pen tip is mountable, a force sense generator configured to generate a force sense, and a processor configured to control the force sense generator to generate the force sense when, with the electronic pen mounted in the housing, a distance between a position of the pen tip of the electronic pen in a virtual reality space and an object in the virtual reality space is equal to or less than a predetermined value.

10 Claims, 11 Drawing Sheets

(56) References Cited

U.S. PATENT DOCUMENTS

| | | | |
|---|---|---|---|
| 8,884,870 B2 | 11/2014 | Grant et al. | |
| 10,564,724 B1 * | 2/2020 | Bergeron | G06F 3/0383 |
| 2001/0002098 A1 | 5/2001 | Haanpaa et al. | |
| 2012/0013530 A1 | 1/2012 | Tsuboi et al. | |
| 2014/0088941 A1 | 3/2014 | Banerjee et al. | |
| 2017/0108930 A1 | 4/2017 | Banerjee et al. | |
| 2018/0081444 A1 | 3/2018 | Yoouku et al. | |
| 2020/0033947 A1 | 1/2020 | Bloom et al. | |
| 2020/0310561 A1 | 10/2020 | Connellan et al. | |

FOREIGN PATENT DOCUMENTS

| | | | |
|---|---|---|---|
| JP | 2010225335 A | 10/2010 | |
| JP | 2010287221 A | 12/2010 | |
| WO | 9200559 A1 | 1/1992 | |
| WO | 2016181469 A1 | 11/2016 | |

OTHER PUBLICATIONS

International Search Report, mailed Jun. 18, 2019, for International Application No. PCT/JP2019/015043. (1 page).
Mizuhara, "What is the VR drawing app "Tilt Brush?" Introducing how to use and purchase," MoguLive, Jul. 26, 2017. (24 pages) (with English machine translation).
Nihon Binary Co., Ltd., "ImmersiveTouch Surgical Training Simulator," as archived Apr. 26, 2018. (4 pages) (with English machine translation).

* cited by examiner

F I G . 1
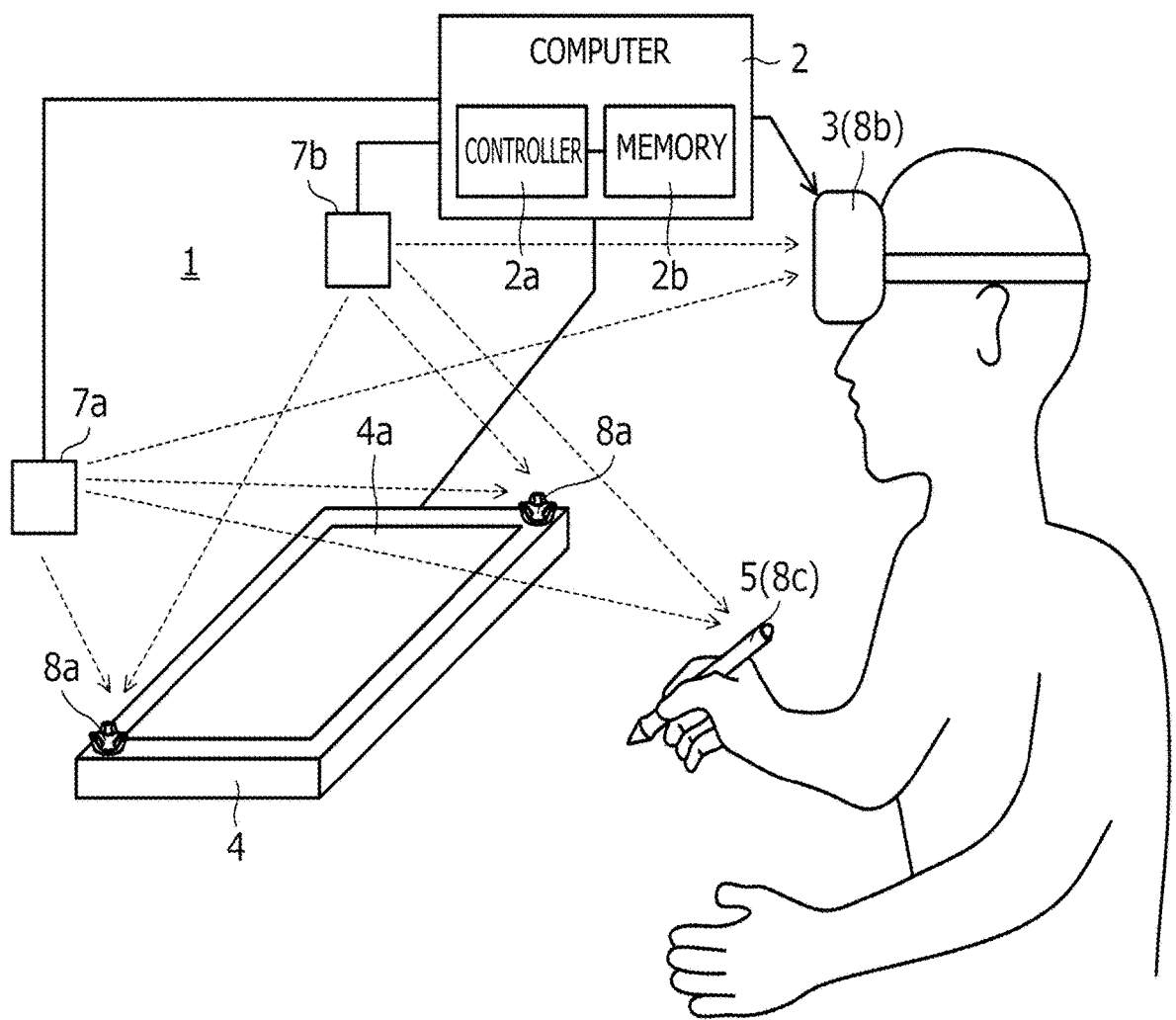

POSITION INDICATING DEVICE AND SPATIAL POSITION INDICATING SYSTEM

BACKGROUND

Technical Field

The present disclosure relates to a position indicating device and a spatial position indicating system, and particularly, to a position indicating device and a spatial position indicating system that support haptics.

Background Art

There is a technology for writing a character and drawing a picture on a virtual plane in a virtual reality (including virtual reality (VR), augmented reality (AR), and mixed reality (MR)) space. For example, "Tilt Brush" described in "VR Oekaki Apuri 'Tilt Brush' Toha? Tsukaikata/Kounyu Houhou mo Shokai" ("What is VR Drawing App 'Tilt Brush?' A Guide to How to Use and Purchase It"), [online], Mogura V R, [retrieved on Feb. 28, 2018], Internet <URL: http://www.moguravr.com/vr-tilt-brush/> enables the user to draw a picture in the air in a virtual reality space by using a dedicated controller. U.S. Pat. No. 8,884,870 discloses a game in which the user can use a virtual marker, paintbrush, and paint spray-can to create artwork or graffiti work on a virtual surface or an actual surface.

As to the virtual reality, a technology called haptics is drawing attention. Haptics provides vibration to the user in the virtual reality. For example, U.S. Pat. No. 8,884,870 discloses a technique of providing an actuator to each of a marker-type controller, a paintbrush-type controller, and a paint spray-can-type controller and applying vibration to each actuator. "ImmersiveTouch Geka Syuzyutsu Toreeningu Syumireeta" (ImmersiveTouch Surgical Training Simulator), [online], Nihon Binary Co., Ltd., [retrieved on Feb. 28, 2018], Internet <URL: http://www.nihonbinary.co.jp/Products/Medical/MedicalTraining/SurgicalSimulation/Imme rsiveTouch.html> discloses a technique of determining an interference between a surgical instrument such as a virtual catheter and a three-dimensional (3D) model based on the position and direction of a stylus mechanically connected to a robot arm and generating a feel (a force-sense property such as viscosity, stiffness, or friction) corresponding to each part.

BRIEF SUMMARY

A widely known pen-type stylus (hereinafter referred to as an "electronic pen") can perform an input to a tablet (including a tablet computer and a digitizer) by transmitting and receiving signals to and from the tablet. In the past, this type of electronic pen has been unable to be used in the virtual reality space. In recent years, however, there has been an increasing demand to use the electronic pen in the virtual reality space.

Therefore, it is desirable to provide a position indicating device capable of making the electronic pen usable in the virtual reality space.

Meanwhile, when the electronic pen is used in the virtual reality space, it is preferable that the electronic pen can perform an input not only to a real tablet but also to a virtual tablet. In this case, it is desirable to generate a force sense in the electronic pen when the pen tip of the electronic pen has collided with a surface of an object in the virtual reality space. However, a position sensor for detecting the position of the electronic pen has a certain size, and at least at this point in time, there is no small position sensor available that can be installed in the pen tip. As a result, even if a force sense is generated when a detected position has collided with the surface of the object, the pen tip is not necessarily present on the surface of the object when the force sense is generated. This gives the user a feeling of strangeness.

Therefore, it is also desirable to provide a spatial position indicating system capable of generating a force sense without giving the user a feeling of strangeness when the user is using the electronic pen in the virtual reality space.

A position indicating device according to one aspect of the present disclosure includes a housing in which an electronic pen including a pen tip is mountable, a force sense generator configured to generate a force sense, and a processor configured to control the force sense generator to generate the force sense when, with the electronic pen mounted in the housing, a distance between a position of the pen tip of the electronic pen in a virtual reality space and an object in the virtual reality space is equal to or less than a predetermined value.

A position indicating device according to another aspect of the present disclosure includes a position indicator, a force sense generator configured to generate a force sense, and a processor configured to control the force sense generator to generate the force sense when a distance between a position of the position indicator in a virtual reality space and an object in the virtual reality space is equal to or less than a predetermined value.

A spatial position indicating system according to one aspect of the present disclosure includes a computer including a processor and a memory storing instructions that, when executed by the processor, cause the computer to: acquire a position of a position indicator of a position indicating device in a real space, acquire a position of the position indicator in a virtual reality space based on the position of the position indicator in the real space, determine whether a distance between the position of the position indicator in the virtual reality space and an object in the virtual reality space is equal to or less than a predetermined value, and transmit a control signal for controlling a force sense generator to the position indicating device including the force sense generator according to whether the distance between the position of the position indicator in the virtual reality space and the object in the virtual reality space is determined to be equal to or less than the predetermined value.

With the position indicating device according to one aspect of the present disclosure, the electronic pen can be mounted in a spatial position indicating device. Therefore, the electronic pen can be used in the virtual reality space.

With the position indicating device according to another aspect of the present disclosure, the electronic pen itself operates as the spatial position indicating device. Therefore, the electronic pen can be used in the virtual reality space.

With the position indicating device and the spatial position indicating system according to one aspect of the present disclosure, the force sense generator of the position indicating device (or the electronic pen) is caused to generate a force sense not based on the position of the position indicating device (or the electronic pen) indicated by position information but based on the position of the pen tip. This configuration can, therefore, cause the force sense generator to generate a force sense without giving a feeling of strangeness to the user who is using the electronic pen in the virtual reality space.

BRIEF DESCRIPTION OF THE DRAWINGS

FIG. 1 is a diagram illustrating a configuration of a spatial position indicating system according to a first embodiment of the present disclosure;

DETAILED DESCRIPTION OF THE PREFERRED EMBODIMENTS

Figure 2A:
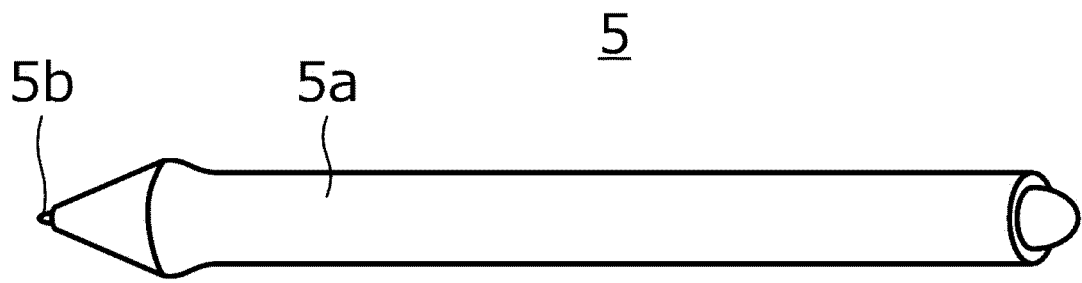
FIG. 2A is a perspective view of the external appearance of an electronic pen.

Hereinafter, embodiments of the present disclosure will be described in detail with reference to the accompanying drawings.

FIG. 1 is a diagram illustrating a configuration of a spatial position indicating system 1 according to a first embodiment of the present disclosure. As illustrated in FIG. 1, the spatial position indicating system 1 according to the present embodiment includes a computer 2, a virtual reality display 3, a tablet 4, an electronic pen 5, lightning houses 7a and 7b, and position sensors 8a to 8c. The position sensors 8a to 8c are provided in the tablet 4, the virtual reality display 3, and the electronic pen 5, respectively.

In principle, each device illustrated in FIG. 1 is provided in a room. In the spatial position indicating system 1, almost the entire room can be used as a virtual reality space.

The computer 2 includes a controller 2a (e.g., a processor) and a memory 2b. Each processing operation performed by the computer 2 described below can be performed by the controller 2a reading and executing a program stored in the memory 2b.

The computer 2 is connected to each of the virtual reality display 3, the lightning houses 7a and 7b, and the tablet 4 by wire or wirelessly. In the case of wired communication, it is preferable to use a universal serial bus (USB), for example. In the case of wireless communication, it is preferable to use a wireless local area network (LAN) such as wireless fidelity (Wi-Fi) (registered trademark) or near-field communication such as Bluetooth (registered trademark), for example. When the tablet 4 and the virtual reality display 3 have a function as a computer, this computer may constitute the computer 2.

The computer 2 has a function of displaying a virtual reality space on the virtual reality display 3. This virtual reality space may be a VR space, an AR space, or an MR space. When the VR space is displayed, the user wearing the virtual reality display 3 recognizes the virtual reality and is disconnected from the real world. By contrast, when the AR space or the MR space is displayed, the user wearing the virtual reality display 3 recognizes a space in which the virtual reality and the real world are mixed.

The computer 2 functions as a rendering device that renders various 3D objects in the virtual reality space set with the positions of the lightning houses 7a and 7b as a reference. The computer 2 also updates the display of the virtual reality display 3 according to the result of the rendering. Accordingly, various 3D objects appear in the virtual reality space displayed on the virtual reality display 3. The computer 2 performs rendering based on 3D object information stored in the memory 2b. The 3D object information is stored in the memory 2b for each 3D object to be rendered and indicates the shape, position, and orientation of the corresponding 3D object in the virtual reality space indicating the virtual reality space set by the computer 2.

The 3D objects rendered by the computer 2 include 3D objects such as the tablet 4 and the electronic pen 5 illustrated in FIG. 1 that also exist in reality (hereinafter referred to as "first 3D objects") and 3D objects such as a virtual tablet (not illustrated) that do not exist in reality (hereinafter referred to as "second 3D objects"). When rendering these 3D objects, the computer 2 first detects the position and orientation of the position sensor 8b in the real space and acquires viewpoint information indicating the viewpoint of the user based on the result of the detection.

When rendering first 3D objects, the computer 2 further detects the positions and orientations of the position sensors (for example, the position sensors 8a and 8c) in the real space, which are mounted in the respective objects, and stores the result of the detection in the memory 2b. Then, the computer 2 renders the first 3D objects in the virtual reality space based on the stored positions and orientations, the above-described viewpoint information, and the shapes stored for the first 3D objects. For the electronic pen 5 in particular, the computer 2 performs processes of detecting the position of the position sensor 8c to detect an operation performed by the user in the virtual reality space, and based on the result, newly creating a second 3D object (that is, newly storing 3D object information in the memory 2b) or moving or updating a second 3D object that is already held (that is, updating 3D object information that is already stored in the memory 2b). These processes will be described in detail later.

When rendering a second 3D object, the computer 2 renders the second 3D object in the virtual reality space based on the corresponding 3D object information stored in the memory 2*b* and the above-described viewpoint information.

The computer 2 further performs a process of determining whether or not to cause a force sense generator 56 (described later) of the electronic pen 5 to generate a force sense based on the position (virtual reality space position) of a pen tip of the electronic pen 5 in the virtual reality space and the position of a 3D object in the virtual reality space. The 3D object is being displayed in the virtual reality space. When the computer 2 has determined to cause the force sense generator 56 to generate a force sense, the computer 2 performs a process of transmitting a control signal for activating the force sense generator 56 to the electronic pen 5. In a specific example, when the pen tip of the electronic pen 5 has contacted a touch surface of the virtual tablet in the virtual reality space, the computer 2 transmits the control signal for activating the force sense generator 56 to the electronic pen 5. These processes will be described again in detail later.

The virtual reality display 3 is a VR display (head-mounted display) that is worn on the head of a human when used. While there are various types of commercially available virtual reality displays such as "a transmissive type" or "a non-transmissive type" or "a glasses type" or "a hat type," any of these virtual reality displays can be used as the virtual reality display 3.

The virtual reality display 3 is connected to each of the position sensors 8*a* and the electronic pen 5 (including the position sensor 8*c*) by wire or wirelessly. Through this connection, each of the position sensors 8*a* and 8*c* notifies the virtual reality display 3 of light reception level information described later. The virtual reality display 3 notifies the computer 2 of the light reception level information notified by each of the position sensors 8*a* and 8*c*, together with light reception level information of the position sensor 8*b* incorporated in the virtual reality display 3. The computer 2 detects the position and orientation of each of the position sensors 8*a* to 8*c* in the real space based on the corresponding light reception level information notified in this manner.

The tablet 4 is a device having a tablet surface 4*a*. The tablet surface 4*a* is preferably a flat surface and can be made of a material suitable for the pen tip of the electronic pen 5 to slide. In one example, the tablet 4 is what is generally called a digitizer and includes a touch sensor and a communication function. The touch sensor detects the position indicated by the electronic pen 5 on a touch surface. The communication function notifies the computer 2 of the detected position indicated by the electronic pen 5. The tablet surface 4*a* in this case includes the touch surface of the digitizer. In another example, the tablet 4 is what is generally called a tablet computer and includes a display, a touch sensor, and a communication function. The touch sensor detects the position indicated by the electronic pen 5 on a display surface of the display. The communication function notifies the computer 2 of the detected position indicated by the electronic pen 5. The tablet surface 4*a* in this case includes the display surface of the display.

The position sensors 8*a* are fixedly installed on the surface of the tablet 4. Therefore, the positions and orientations of the position sensors 8*a* detected by the computer 2 indicate the position and orientation of the tablet surface 4*a* in a virtual reality space coordinate system.

The electronic pen 5 is a stylus having a pen shape. The electronic pen 5 has a function as an input device for the tablet 4 (hereinafter referred to as a "tablet input function") and a function as an input device for the computer 2 (hereinafter referred to as a "virtual reality space input function"). The tablet input function includes a function of indicating a position on the touch surface of the tablet 4. The virtual reality space input function includes a function of indicating a position in the virtual reality space. Details of each function will be described later.

The lightning houses 7*a* and 7*b* are base station devices that are included in a position detection system for detecting the positions of the position sensors 8*a* to 8*c*. Each of the lightning houses 7*a* and 7*b* is capable of emitting a laser signal while changing its direction under the control of the computer 2. Each of the position sensors 8*a* to 8*c* includes a plurality of light receiving sensors. The light receiving sensors receive laser signals emitted by the respective lightning houses 7*a* and 7*b* to acquire light reception level information including their respective light reception levels. Each light reception level information acquired in this manner is supplied to the computer 2 via the virtual reality display 3 as described above.

Figure 2B:
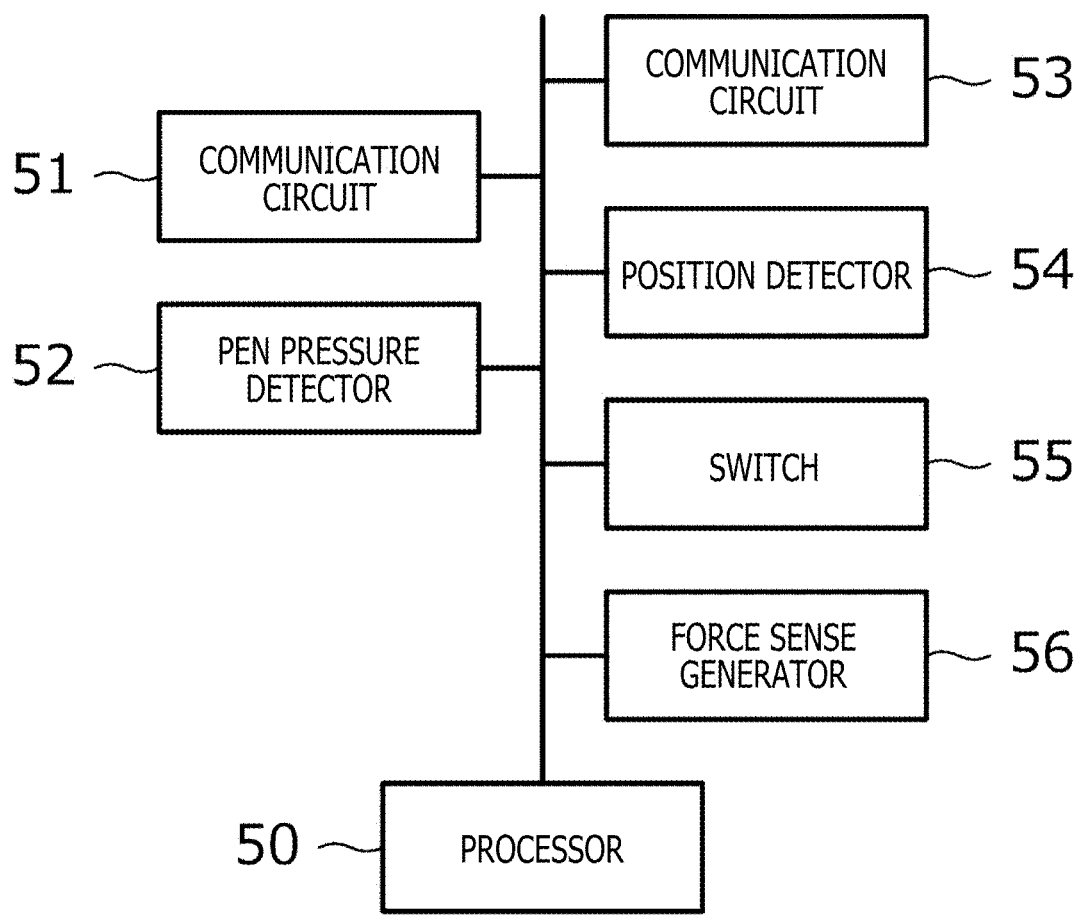
FIG. 2B is a schematic block diagram illustrating functional blocks of the electronic pen.

FIG. 2A is a perspective view of the external appearance of the electronic pen 5. FIG. 2B is a schematic block diagram illustrating functional blocks of the electronic pen 5. As illustrated in FIG. 2A, the electronic pen 5 includes a housing 5*a* and a pen tip 5*b* (position indicator). The housing 5*a* has a substantially cylindrical shape. The pen tip 5*b* is provided at the tip of the housing 5*a*. Although various members for implementing the force sense generator 56 described later may be attached to a surface of the actual electronic pen 5, these members are not illustrated in FIG. 2A. Although not illustrated, various switches may be provided on a side surface or end portion of the electronic pen 5.

When the user performs an input using the tablet input function, the user holds the housing 5*a* with one hand and brings the pen tip 5*b* into contact with the touch surface of the tablet 4. Subsequently, the user moves the pen tip 5*b* on the touch surface while maintaining the contact. In this manner, the user performs the input operation with the electronic pen 5. When the user performs an input using the virtual reality space input function, the user holds the housing 5*a* with one hand and moves the electronic pen 5 in the air. In this manner, the user performs the input operation with the electronic pen 5. The input using the virtual reality space input function includes the above-described input to the virtual tablet. In this case, while the user wearing the virtual reality display 3 can see the virtual tablet, there is no tablet at that location in reality. This makes it difficult for the user to perform an input to the virtual tablet since the user cannot bring the pen tip 5*b* into contact with the touch surface of the virtual tablet. Therefore, the spatial position indicating system 1 generates a force sense when the pen tip 5*b* is located on the touch surface of the virtual tablet. By performing this process, the spatial position indicating system 1 makes the user feel as if the pen tip 5*b* were in contact with the touch surface of the virtual tablet. This process will be described in detail later.

Referring to FIG. 2B, the electronic pen 5 functionally includes a processor 50, communication circuits 51 and 53, a pen pressure detector 52, a position detector 54, a switch 55, and the force sense generator 56.

The processor 50 includes a processor that is connected to each of the other circuits in the electronic pen 5 and controls these circuits while performing various processes described later. Although the processor 50 is provided inside the electronic pen 5 in the present embodiment, the position of the processor 50 is not limited thereto and the processor 50 may be provided outside the electronic pen 5.

The communication circuit 51 and the pen pressure detector 52 are functional circuits that implement the tablet input function.

The communication circuit 51 has a function of transmitting and receiving signals to and from the touch sensor of the tablet 4 under the control of the processor 50. The signal transmission and reception include a case where signals are unidirectionally transmitted from the electronic pen 5 to the tablet 4 and a case where signals are bidirectionally transmitted and received between the electronic pen 5 and the tablet 4. For example, an electromagnetic induction method or an active capacitive method can be used as a specific method of the signal transmission and reception.

The pen pressure detector 52 is a functional unit that detects a pressure (pen pressure) applied to the pen tip 5*b*. As a specific example, the pen pressure detector 52 includes a capacitance sensor (not illustrated) whose capacitance value changes according to the pen pressure. The tablet input function will be specifically described below, assuming that the communication circuit 51 transmits and receives signals using the active capacitive method, as one example.

The touch sensor supporting the active capacitive method transmits a beacon signal at a predetermined time interval from a sensor electrode (not illustrated) provided in the touch surface. The beacon signal includes a command for controlling the electronic pen 5 from the touch sensor. The control by the command includes, for example, causing the electronic pen 5 to transmit pen pressure data indicating a pen pressure detected by the pen pressure detector 52, transmit a pressing state of various switches (not illustrated) provided in the electronic pen 5, and transmit a unique identification (ID) stored in a memory (not illustrated) of the electronic pen 5 in advance.

The communication circuit 51 detects the beacon signal via a pen tip electrode (not illustrated) provided in the pen tip 5*b* of the electronic pen 5 and supplies the detected beacon signal to the processor 50. The processor 50 generates a pen signal including a burst signal and a data signal according to the supplied beacon signal and supplies the pen signal to the communication circuit 51. The burst signal is an unmodulated carrier wave. The data signal is obtained by modulating a carrier wave with data corresponding to the command. The communication circuit 51 transmits the supplied pen signal to the touch sensor via the pen tip electrode.

The touch sensor attempts to detect the burst signal using the sensor electrode and detects the position of the electronic pen 5 on the touch surface based on the result of the detection. The touch sensor also detects and demodulates the data signal using the sensor electrode to receive the data transmitted by the electronic pen 5 according to the command.

The tablet 4 sequentially transmits the acquired position of the electronic pen 5 and the data transmitted by the electronic pen 5 to the computer 2. When the pen pressure indicated by the pen pressure data included in the data received from the tablet 4 is greater than a predetermined value (for example, 0), the computer 2 determines that the electronic pen 5 is in contact with the touch surface of the tablet 4. While the computer 2 determines that the electronic pen 5 is in contact with the touch surface of the tablet 4, the computer 2 continuously performs processes of generating ink data (curve data obtained by interpolating a plurality of positions with a predetermined interpolation curve) based on a series of sequentially received positions and storing the ink data in the memory 2*b* illustrated in FIG. 1. The tablet input function is implemented in this manner. When the tablet 4 includes a display, the computer 2 may sequentially render the ink data stored in the memory 2*b* and display the result on the display of the tablet 4.

The communication circuit 53, the position detector 54, the switch 55, and the force sense generator 56 are functional circuits that implement the virtual reality space input function.

The communication circuit 53 has a function of transmitting and receiving signals to and from the computer 2 via the virtual reality display 3 under the control of the processor 50. The communication circuit 53 transmits signals by wire or wirelessly, as described above.

The position detector 54 is a functional unit including the position sensor 8*c* illustrated in FIG. 1. The position detector 54 has functions of detecting laser signals (position detection signals for detecting a position in the real space) transmitted by the lightning houses 7*a* and 7*b* and generating light reception level information (position information) according to the detected laser signals. The light reception level information generated by the position detector 54 is transmitted to the computer 2 by the communication circuit 53.

The switch 55 is provided on the surface of the housing 5*a* of the electronic pen 5 and can be pressed by the user. Switch information indicating a pressing state of the switch 55 is also transmitted to the computer 2 by the communication circuit 53.

The force sense generator 56 has a function of generating a force sense in response to a control signal supplied from outside of the electronic pen 5. This control signal is supplied from the computer 2 through the communication circuit 53. More details of the force sense generator 56 will be described later.

The computer 2 sequentially detects the position and orientation of the position sensor 8*c* based on the received light reception level information and determines whether or not the switch 55 is pressed based on the received switch information. While the computer 2 determines that the switch 55 is pressed, the computer 2 performs processes of continuously generating 3D ink data based on a series of sequentially detected positions and storing the 3D ink data in the memory 2*b* illustrated in FIG. 1. The 3D ink data generated in this manner corresponds to the above-described second 3D object and is the target of the above-described rendering. The virtual reality space input function is implemented in this manner.

When the above-described virtual tablet is displayed in the virtual reality space, the computer 2 generates 3D ink data as long as the pen tip 5*b* of the electronic pen 5 is in contact with the touch surface of the virtual tablet in the virtual reality space. In this manner, the user can perform an input to the virtual tablet in a similar manner to an input to the actual tablet 4. In this case, the 3D ink data may be generated regardless of the pressing state of the switch 55.

The overview of the spatial position indicating system 1 has been described above. Next, a configuration of the force sense generator 56 provided in the electronic pen 5 will be described in detail. Since the force sense generator 56 can have various configurations, seven examples will be described below one by one.

Figure 7:
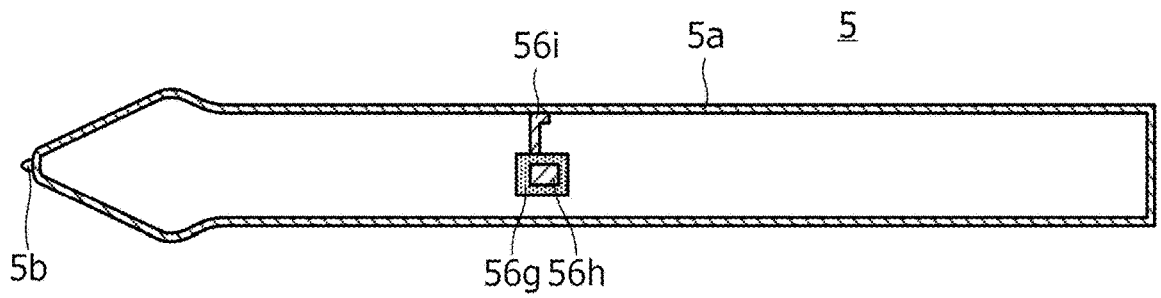
FIG. 7 is a view illustrating a fifth example of the configuration of the force sense generator illustrated in FIG. 2B.
Figure 8A:
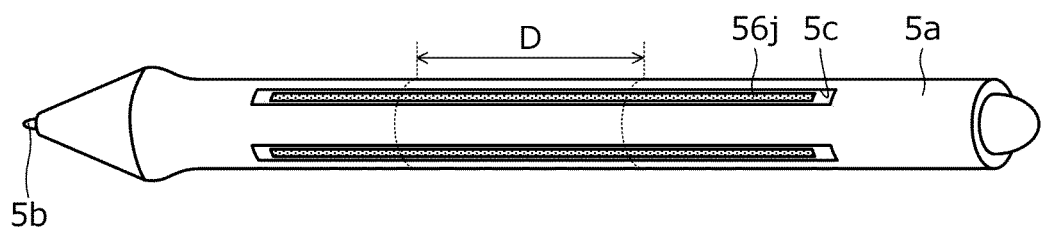
FIGS. 8A and 8B are views illustrating a sixth example of the configuration of the force sense generator illustrated in FIG. 2B.
Figure 8B:
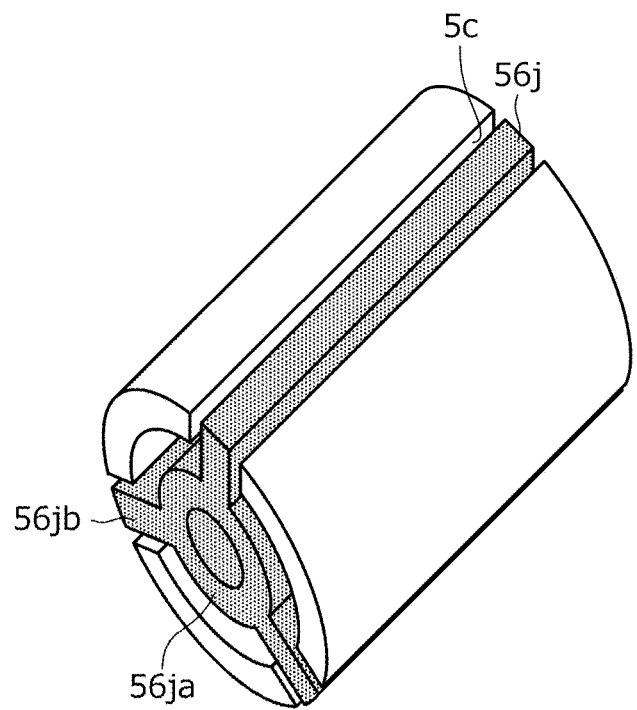
Figure 9:
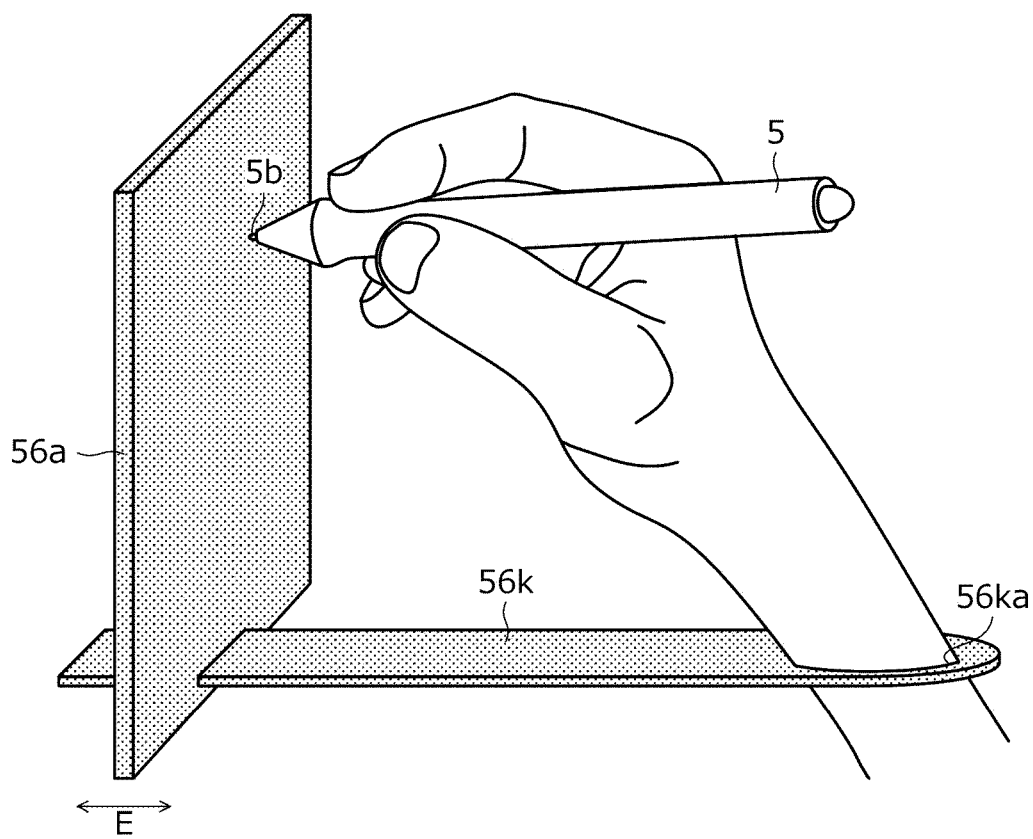
FIG. 9 is a view illustrating a seventh example of the configuration of the force sense generator illustrated in FIG. 2B.

FIGS. 3A to 9 illustrate first to seventh examples of the configuration of the force sense generator 56. FIG. 3A to FIG. 7 are sectional views of the electronic pen 5. FIG. 8A is a perspective view of the electronic pen 5. FIG. 8B is an exploded perspective view of a portion D illustrated in FIG. 8A. FIG. 9 is a perspective view of the electronic pen 5 being used.

Figure 3A:
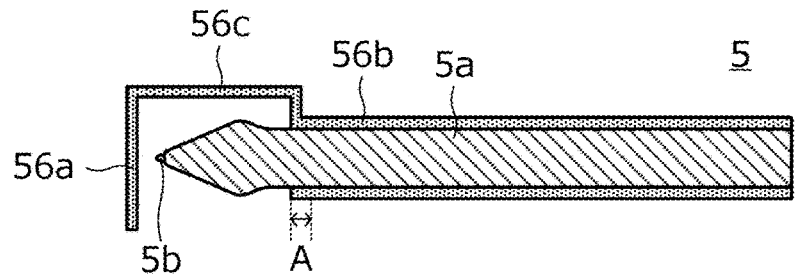
FIGS. 3A and 3B are views illustrating a first example of a configuration of a force sense generator illustrated in FIG. 2B.
Figure 3B:
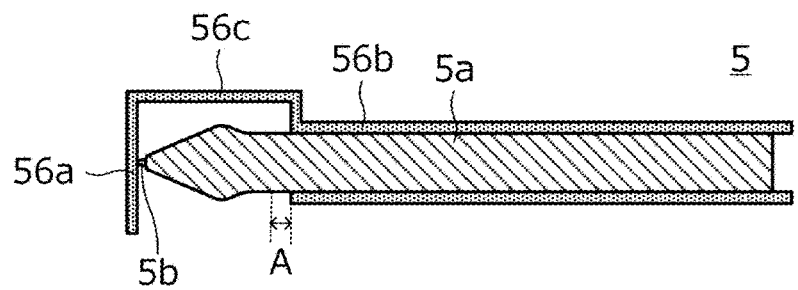

As illustrated in FIGS. 3A and 3B, the force sense generator 56 according to the first example includes an abutment portion 56a, a sliding portion 56b, and a bridge portion 56c. The abutment portion 56a has a flat-plate shape and is provided in front of the pen tip 5b. The sliding portion 56b is a cylindrical member provided so as to cover the housing 5a. The bridge portion 56c is fixed to both the abutment portion 56a and the sliding portion 56b.

The sliding portion 56b is slidable on the housing 5a in a longitudinal direction of the housing 5a within an illustrated range A from a position illustrated in FIG. 3A to a position illustrated in FIG. 3B. However, when the user is holding the electronic pen 5, the sliding portion 56b is fixed to the user's hand. Thus, it is the housing 5a that actually moves by this sliding. When the sliding portion 56b is in the position illustrated in FIG. 3A, the pen tip 5b is not in contact with the abutment portion 56a. When the sliding portion 56b is in the position illustrated in FIG. 3B, the pen tip 5b is in contact with the abutment portion 56a. The processor 50 causes the housing 5a to move from the position illustrated in FIG. 3A to the position illustrated in FIG. 3B in response to the control signal received from the computer 2. This makes the pen tip 5b collide with the abutment portion 56a. Since the computer 2 transmits the control signal when the pen tip 5b of the electronic pen 5 has contacted the touch surface of the virtual tablet in the virtual reality space, the user can feel the contact of the pen tip 5b of the electronic pen 5 with the touch surface of the virtual tablet as a real shock.

It is preferable that the force sense generator 56 include a magnetic fluid. The magnetic fluid is a material whose hardness can be controlled by the frequency of an applied pulse current. Changing the frequency of the pulse current applied to the magnetic fluid makes a continuous transition between a relatively hard state and a relatively soft state. This enables a human who is in contact with the magnetic fluid to feel as if vibration occurred. Moreover, changing the hardness of the magnetic fluid can also move various objects.

Figure 10:
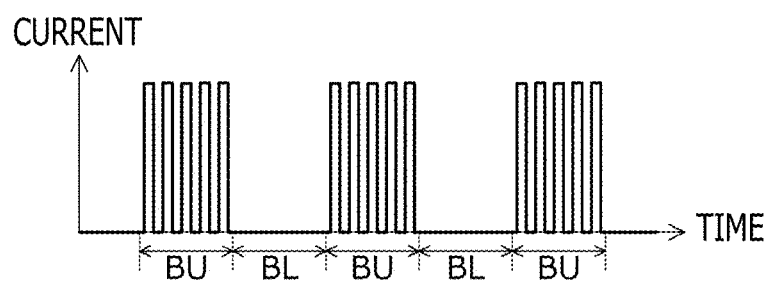
FIG. 10 is a graph illustrating an example of a control signal generated by a computer when the force sense generator is configured to move a housing by using a change in a hardness of a magnetic fluid.

FIG. 10 is a graph illustrating an example of the control signal generated by the computer 2 when the force sense generator 56 is configured to move the housing 5a by using a change in the hardness of the magnetic fluid. As illustrated in FIG. 10, the control signal in this case includes a pulse current signal in which a burst period BU and a blank period BL are repeated at a constant duty ratio. In response to this control signal, the magnetic fluid becomes harder as the ratio of the burst period BU in the entire section increases. Therefore, the computer 2 controls the hardness of the magnetic fluid by controlling the duty ratio of the control signal. This, as a result, moves the housing 5a. A force sense can be generated by the magnetic fluid in this manner.

Figure 4A:
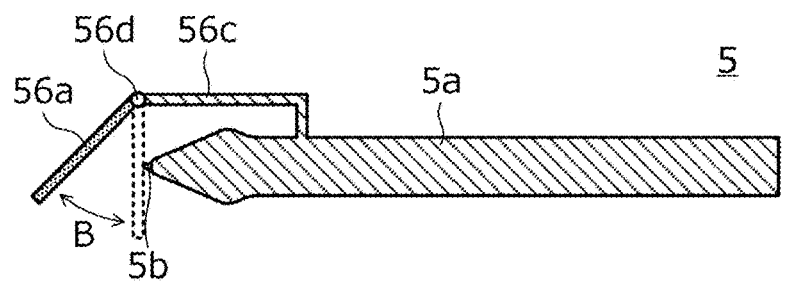
FIGS. 4A and 4B are views illustrating a second example of the configuration of the force sense generator illustrated in FIG. 2B.
Figure 4B:
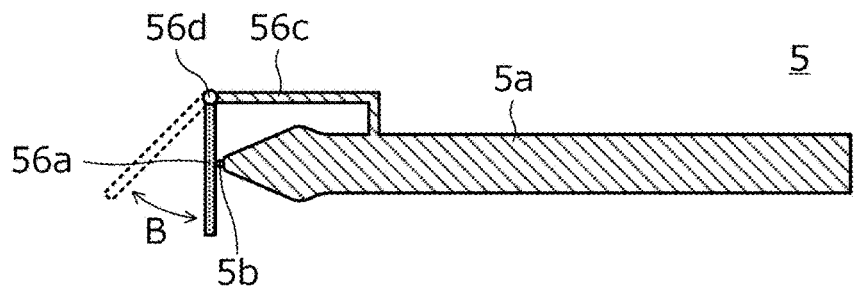

As illustrated in FIGS. 4A and 4B, the force sense generator 56 according to the second example includes the abutment portion 56a, the bridge portion 56c, and a hinge portion 56d. The abutment portion 56a has a flat-plate shape and is provided in front of the pen tip 5b. The bridge portion 56c is fixed to the housing 5a. The hinge portion 56d is provided between the abutment portion 56a and the bridge portion 56c.

The abutment portion 56a is turnable about one end of the abutment portion 56a connected to the hinge portion 56d within an illustrated range B from a position illustrated in FIG. 4A to a position illustrated in FIG. 4B. When the abutment portion 56a is in the position illustrated in FIG. 4A, the pen tip 5b is not in contact with the abutment portion 56a. When the abutment portion 56a is in the position illustrated in FIG. 4B, the pen tip 5b is in contact with the abutment portion 56a. In this example as well, it is preferable that the abutment portion 56a be moved using the magnetic fluid.

The processor 50 causes the abutment portion 56a to move from the position illustrated in FIG. 4A to the position illustrated in FIG. 4B in response to the control signal received from the computer 2. Since this makes the pen tip 5b collide with the abutment portion 56a, the user can feel the contact of the pen tip 5b of the electronic pen 5 with the touch surface of the virtual tablet as a real shock, as with the first example.

Figure 5A:
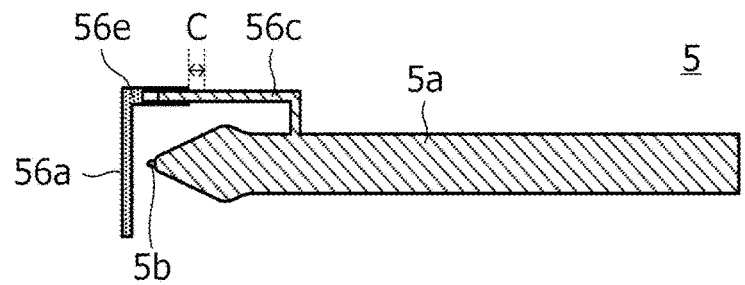
FIGS. 5A and 5B are views illustrating a third example of the configuration of the force sense generator illustrated in FIG. 2B.
Figure 5B:
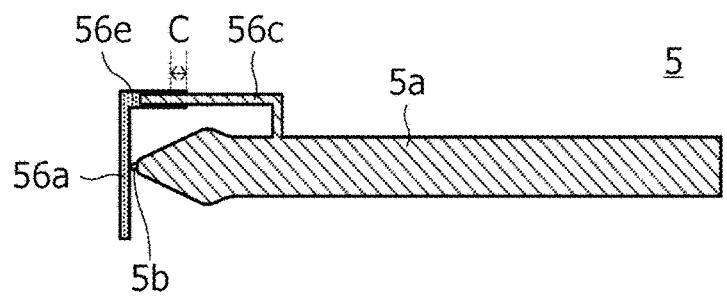

As illustrated in FIGS. 5A and 5B, the force sense generator 56 according to the third example includes the abutment portion 56a, the bridge portion 56c, and a sliding portion 56e. The abutment portion 56a has a flat-plate shape and is provided in front of the pen tip 5b. The bridge portion 56c is fixed to the housing 5a. The sliding portion 56e and the abutment portion 56a are integrally formed.

As illustrated in FIGS. 5A and 5B, the sliding portion 56e has a mortise that accommodates an end portion of the bridge portion 56c, for example. The bridge portion 56c slides in this mortise so that the sliding portion 56e is movable in the longitudinal direction of the electronic pen 5 within an illustrated range C from a position illustrated in FIG. 5A to a position illustrated in FIG. 5B. When the sliding portion 56e is in the position illustrated in FIG. 5A, the pen tip 5b is not in contact with the abutment portion 56a. When the sliding portion 56e is in the position illustrated in FIG. 5B, the pen tip 5b is in contact with the abutment portion 56a. In this example as well, it is preferable that the sliding portion 56e be moved using the magnetic fluid.

The processor 50 causes the sliding portion 56e to move from the position illustrated in FIG. 5A to the position illustrated in FIG. 5B in response to the control signal received from the computer 2. Since this makes the pen tip 5b collide with the abutment portion 56a, the user can feel the contact of the pen tip 5b of the electronic pen 5 with the touch surface of the virtual tablet as a real shock, as with the first and second examples.

Figure 6:
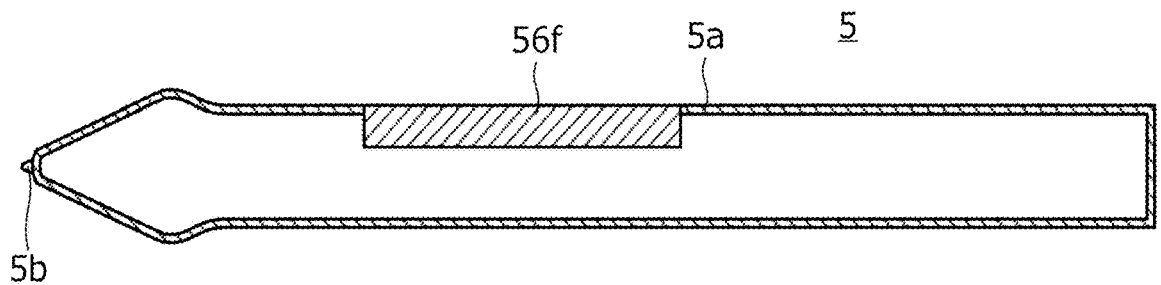
FIG. 6 is a view illustrating a fourth example of the configuration of the force sense generator illustrated in FIG. 2B.

As illustrated in FIG. 6, the force sense generator 56 according to the fourth example includes a hardness changing portion 56f. The hardness changing portion 56f is provided so as to be exposed on the surface of the housing 5a. The hardness changing portion 56f includes vinyl or the like including the magnetic fluid described above.

The processor 50 changes the hardness of the hardness changing portion 56f by supplying the control signal received from the computer 2 to the hardness changing portion 56f. Since this makes the user feel as if the hardness changing portion 56f vibrated, the user can feel the contact of the pen tip 5b of the electronic pen 5 with the touch surface of the virtual tablet as a real shock, as with the first to third examples.

As illustrated in FIG. 7, the force sense generator 56 according to the fifth example includes a base portion 56g, a vibration portion 56h, and an actuator 56i. The base portion 56g is fixed to the housing 5a. The vibration portion 56h is provided inside the base portion 56g. The actuator 56i is a high-rigidity member having one end pressed against the vibration portion 56h and the other end pressed against an inner wall of the housing 5a.

The processor 50 causes the vibration portion 56h to vibrate by supplying the control signal received from the computer 2 to the vibration portion 56h. Since the vibration transmitted to the housing 5a through the actuator 56i causes the housing 5a to vibrate, the user can feel the contact of the pen tip 5b of the electronic pen 5 with the touch surface of the virtual tablet as a real shock, as with the first to fourth examples.

As illustrated in FIG. 8A, the force sense generator 56 according to the sixth example includes grooves 5c and a vibration portion 56j. The grooves 5c are provided in the housing 5a. The vibration portion 56j is provided inside the housing 5a. A part of the vibration portion 56j is exposed to the outside through the corresponding groove 5c. The vibration portion 56j includes the magnetic fluid described above.

FIG. 8B illustrates a specific structure of the grooves 5c and the vibration portion 56j. As illustrated in FIG. 8B, the vibration portion 56j includes a base portion 56ja and three protrusions 56jb. The base portion 56ja is a cylindrical member provided inside the housing 5a. The protrusions 56jb are provided so as to protrude from a side surface of the base portion 56ja. The three protrusions 56jb are formed integrally with the base portion 56ja and provided at equal intervals in a circumferential direction of the base portion 56ja. The grooves 5c are provided so as to correspond to the respective protrusions 56jb.

The processor 50 causes the vibration portion 56j to vibrate by supplying the control signal received from the computer 2 to the vibration portion 56j. Since the user can directly feel this vibration through these three protrusions 56jb exposed through the respective grooves 5c, the user can feel the contact of the pen tip 5b of the electronic pen 5 with the touch surface of the virtual tablet as a real shock, as with the first to fifth examples.

As illustrated in FIG. 9, the force sense generator 56 according to the seventh example is provided separately from a main body of the electronic pen 5. Specifically, the force sense generator 56 according to the seventh example includes the abutment portion 56a and a bridge portion 56k. The abutment portion 56a has a flat-plate shape and is provided in front of the pen tip 5b. The bridge portion 56k is fixed to the user's arm. Specifically, an opening 56ka is provided in the vicinity of one end of the bridge portion 56k. When the user inserts the user's arm into the opening 56ka, the bridge portion 56k is fixed to the user's arm.

The abutment portion 56a is movable in the vicinity of the other end of the bridge portion 56k within a range E illustrated in FIG. 9. A specific movement range of the abutment portion 56a is determined such that the abutment portion 56a contacts the pen tip 5b when the abutment portion 56a comes closest to the electronic pen 5. Considering that the size of a hand varies depending on the user, it is preferable that the movement range of the abutment portion 56a be adjusted for each user by a calibration process performed in advance. In this example as well, it is preferable that the abutment portion 56a be moved using the magnetic fluid.

The processor 50 causes the abutment portion 56a to collide with the pen tip 5b by supplying the control signal received from the computer 2 to the force sense generator 56. This makes the user feel the contact of the pen tip 5b of the electronic pen 5 with the touch surface of the virtual tablet as a real shock, as with the first to sixth examples.

The configuration of the force sense generator 56 provided for the electronic pen 5 has been described above with seven examples. The following describes the details of the generation of the control signal by the computer 2 for the force sense generator 56.

Figure 11:
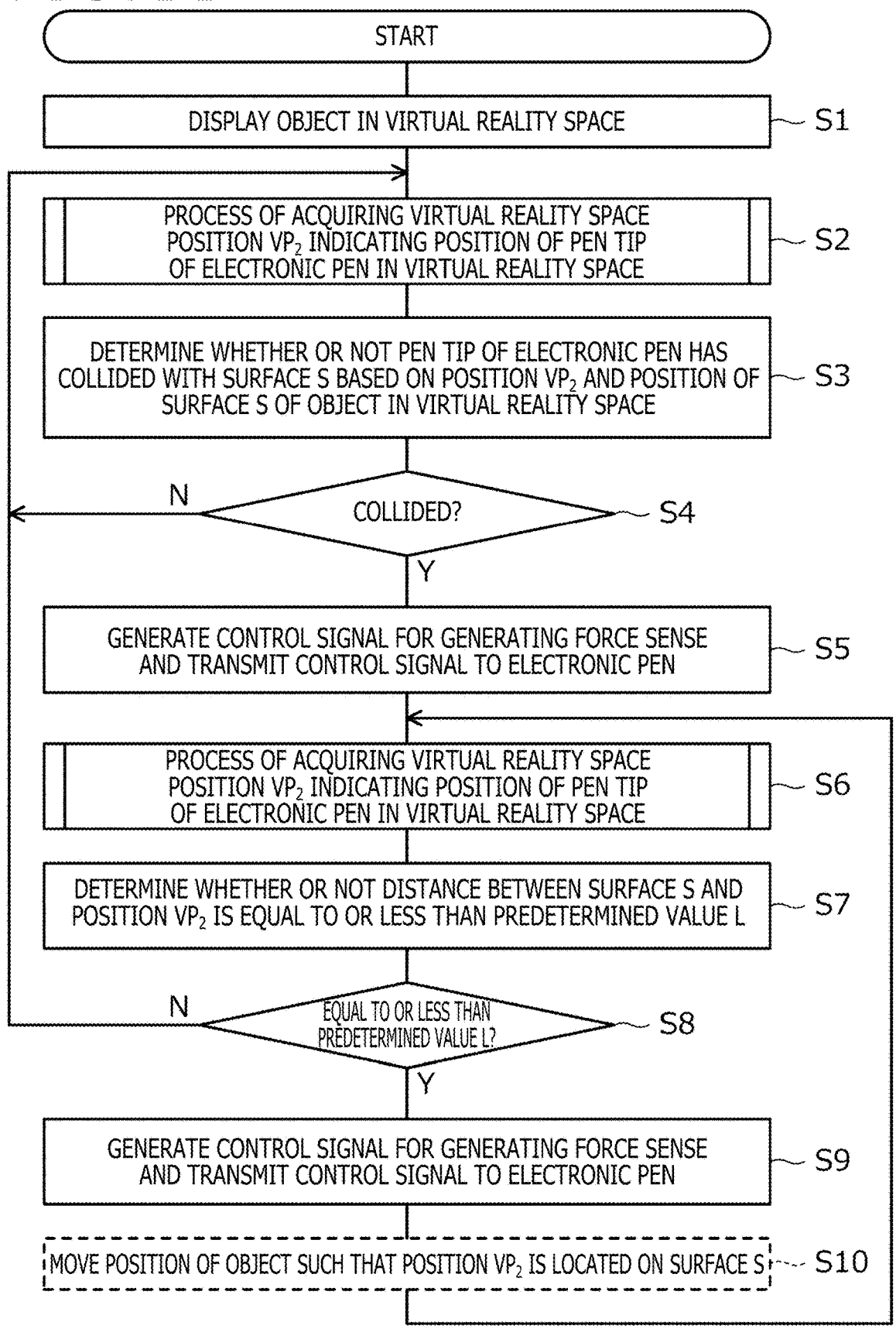
FIG. 11 is a processing flowchart illustrating processing performed by a controller of the computer.
Figure 12:
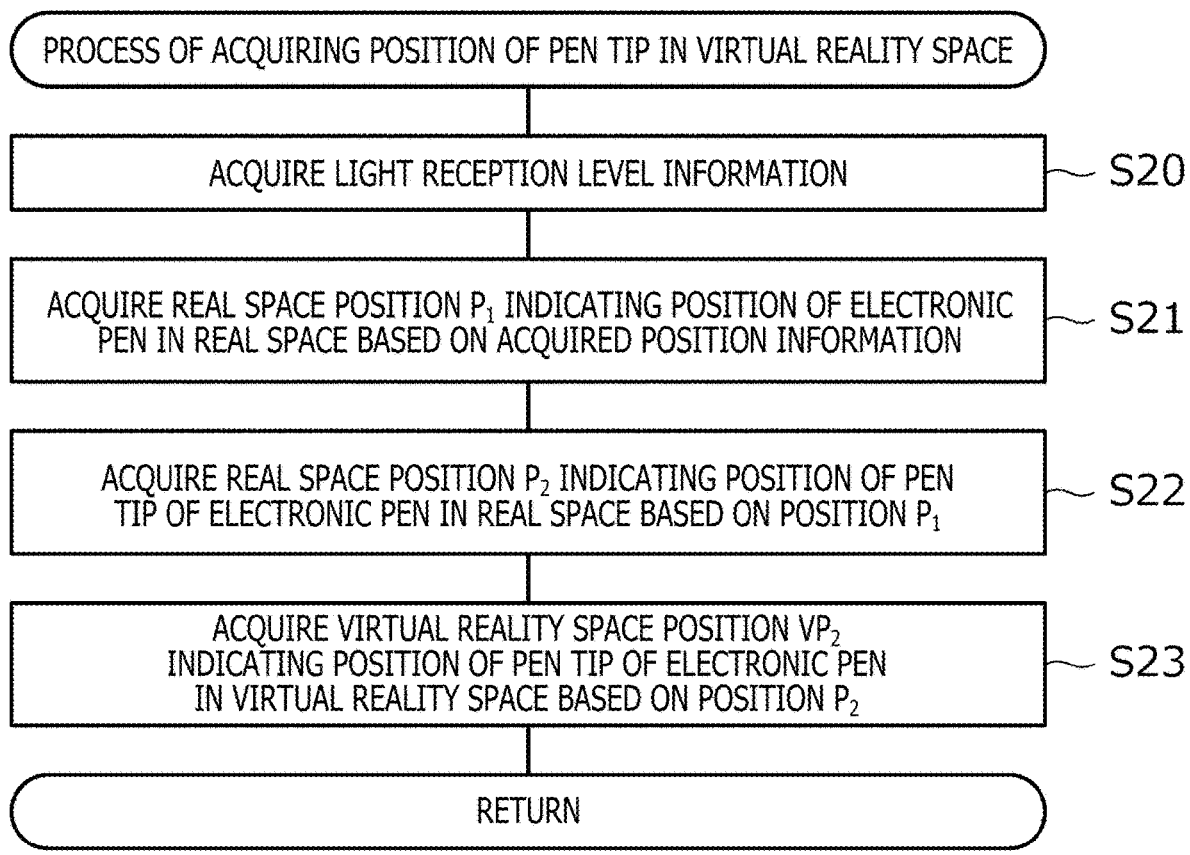
FIG. 12 is a processing flowchart illustrating details of a process of acquiring a position of a pen tip in a virtual reality space performed at S2 and S6 of FIG. 11.
Figure 13A:
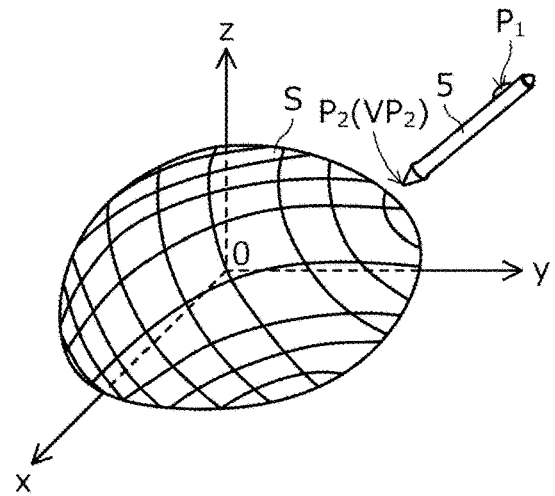
FIGS. 13A to 13C are diagrams for describing the processing performed in FIG. 11.
Figure 13B:
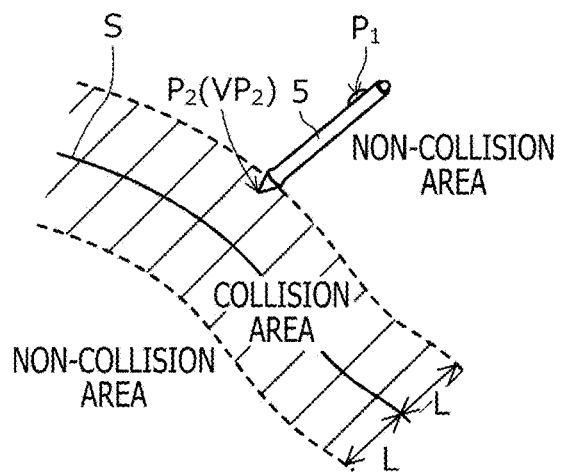
Figure 13C:
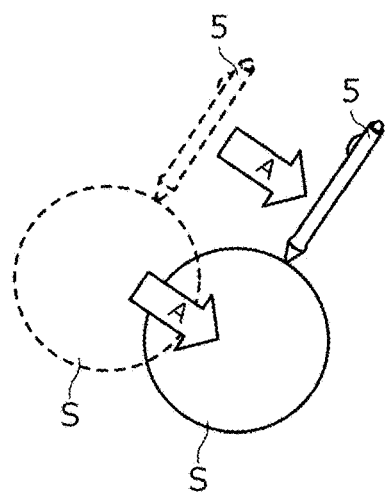

FIG. 11 is a processing flowchart illustrating processing performed by the controller 2a (see FIG. 1) of the computer 2. FIG. 12 is a processing flowchart illustrating details of a process of acquiring the position of the pen tip in the virtual reality space performed at S2 and S6 of FIG. 11. FIGS. 13A to 13C are diagrams for describing the processing performed in FIG. 11. The following describes the details of the generation of the control signal by the computer 2 for the force sense generator 56 with reference to FIG. 11 to FIG. 13C.

Referring now to FIG. 11, the computer 2 first displays an object in the virtual reality space as a premise (S1). This object is, for example, the above-described second 3D object (for example, the virtual tablet). FIG. 13A illustrates a surface S of the object displayed in this manner in a three-dimensional coordinate space.

Subsequently, the computer 2 performs a process of acquiring a position VP2 of the pen tip 5b of the electronic pen 5 in the virtual reality space (S2). Specifically, as illustrated in FIG. 12, the computer 2 first acquires light reception level information (S20). This light reception level information is generated by the position detector 54 (see FIG. 2B) of the electronic pen 5 and the computer 2 acquires the light reception level information received from the electronic pen 5.

The computer 2, which has acquired the light reception level information, acquires (calculates) a real space position $P_1$ (first real space position) based on the acquired light reception level information (S21). The real space position $P_1$ indicates the position of the electronic pen 5 in the real space. The position $P_1$ acquired in this manner is the position of the position sensor 8c illustrated in FIG. 1 and is not the position of the pen tip 5b. Therefore, the computer 2 performs a process of converting the position of the position sensor 8c into the position of the pen tip 5b based on the shape of the electronic pen 5 stored in the memory 2b in advance to acquire (calculate) the real space position $P_2$ (second real space position) indicating the position of the pen tip 5b of the electronic pen 5 in the real space (S22).

Subsequently, the computer 2 acquires (calculates) a virtual reality space position $VP_2$ based on the acquired position $P_2$ (S23). The virtual reality space position $VP_2$ indicates the position of the pen tip 5b of the electronic pen 5 in the virtual reality space. The computer 2 ends the process of acquiring the position of the pen tip in the virtual reality space here.

Referring back to FIG. 11, the computer 2, which has acquired the position $VP_2$, determines whether or not the pen tip 5b of the electronic pen 5 has collided with the surface S of the object (displayed at S1) based on the position $VP_2$ and the position of the surface S in the virtual reality space (S3 and S4). Specifically, the computer 2 only has to determine that the collision has occurred when the position $VP_2$, which is a point, is included in an area forming the surface S, and determine that the collision has not occurred when the position $VP_2$ is not included in the area.

When the computer 2 determines at S4 that the collision has occurred (Yes at S4), the computer 2 generates a control signal for generating a force sense and transmits the control signal to the electronic pen 5 (S5). This control signal is, for example, the pulse current signal illustrated in FIG. 10. The processor 50 of the electronic pen 5 causes the force sense generator 56 to generate a force sense in response to the control signal, so that the user can gain an experience of collision with the surface S (for example, the touch surface of the virtual tablet).

Subsequently, the computer 2 performs the process of acquiring the virtual reality space position $VP_2$ again (S6), and determines whether or not the distance between the surface S and the position $VP_2$ is equal to or less than a predetermined value L (S7 and S8). In this process, the computer 2 only has to determine whether or not the distance between the position $VP_2$ and a point where a normal line of the surface S passing through the position $VP_2$ intersects the surface S is equal to or less than the predetermined value L.

When the computer 2 determines at S8 that the distance is equal to or less than the predetermined value L (Yes at S8), the computer 2 generates the control signal for generating a force sense again and transmits the control signal to the electronic pen 5 (S9). Accordingly, even if the pen tip 5b of the electronic pen 5 leaves the surface S due to hand movement, the user can continue to feel that the pen tip 5b of the electronic pen 5 is in contact with the surface S as long as the pen tip 5b is not too far from the surface S. Since it is difficult to intentionally keep the pen tip 5b in contact with the surface S that does not exist in reality, this process is effective in the virtual reality space.

The computer 2, which has completed S9, returns to S6 and continues the processing. Accordingly, while the distance between the surface S and the position $VP_2$ is equal to or less than the predetermined value L (that is, while the determination result at S8 is Yes), the user can continue to feel that the pen tip 5b is in contact with the surface S.

As indicated by a broken line in FIG. 11, the computer 2 may perform, together with S9, a process of moving the position of the object such that the position $VP_2$ is located on the surface S (S10). Accordingly, the contact state can be maintained not only in terms of a force sense but also in terms of a visual sense.

When the computer 2 determines in S4 that the collision has not occurred (No at S4) and when the computer 2 determines at S8 that the distance is not equal to or less than the predetermined value L (No at S8), the computer 2 returns to S2 and continues the processing. In this case, since no force sense is generated by the force sense generator 56, it is possible to prevent a force sense from being generated when there is a distance between the position $VP_2$ and the surface S. This configuration can, therefore, cause the force sense generator 56 to generate a force sense without giving a feeling of strangeness to the user who is using the electronic pen 5 in the virtual reality space.

In the example of FIG. 11, a condition for stopping the force sense generation after the pen tip 5b of the electronic pen 5 collides with the surface S once (that is, a condition for returning to S2) is when the distance between the surface S and the position $VP_2$ is no longer equal to or less than the predetermined value L. Alternatively, other events may be used as the condition for stopping the force sense generation. For example, when the moving distance of the electronic pen 5 after the pen tip 5b collides with the surface S exceeds a predetermined value, when the moving speed of the electronic pen 5 exceeds a predetermined value, when the acceleration of the electronic pen 5 exceeds a predetermined value, when the user makes a predetermined gesture using the electronic pen 5, when it is detected that the user has performed a predetermined voice input using a microphone, not illustrated, or when a pressure sensor (for example, a pressure sensor provided on the side surface of the electronic pen 5 to measure a gripping force of the user gripping the electronic pen 5), not illustrated, detects that the user has applied a predetermined pressure, the force sense generation may be stopped.

With the electronic pen 5 according to the present embodiment, as described above, since the electronic pen 5 itself includes the position detector 54 and the electronic pen 5 operates as a spatial position indicating device, the electronic pen 5 can be used in the virtual reality space.

The spatial position indicating system 1 according to the present embodiment can cause the force sense generator 56 to generate a force sense, not based on the position of the electronic pen 5 indicated by the light reception level information, but based on the position of the pen tip 5b. This configuration can, therefore, cause the force sense generator 56 to generate a force sense without giving a feeling of strangeness to the user who is using the electronic pen 5 in the virtual reality space.

Figure 14A:
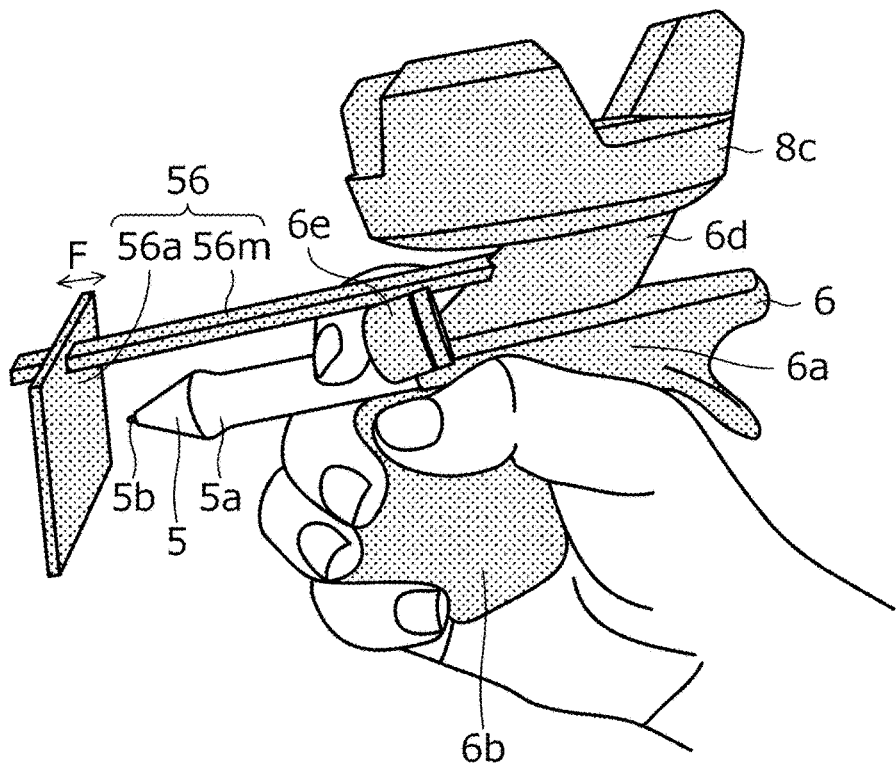
FIGS. 14A and 14B illustrate a spatial position indicating device for use in a spatial position indicating system according to a second embodiment of the present disclosure.
Figure 14B:
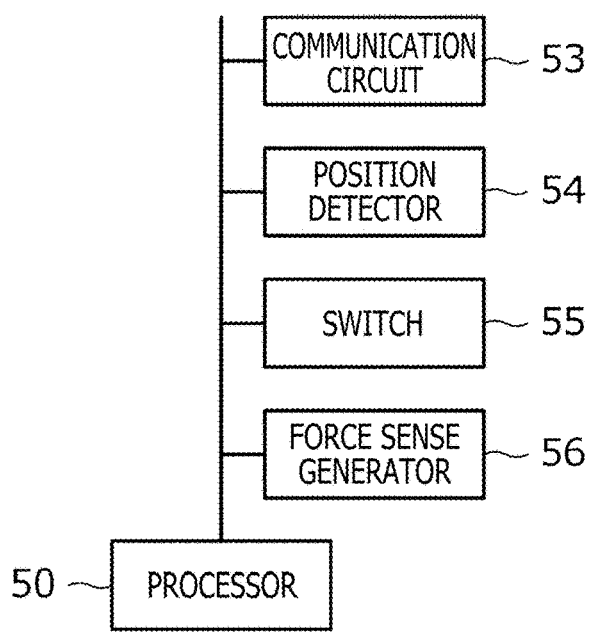

FIGS. 14A and 14B illustrate a spatial position indicating device 6 for use in the spatial position indicating system 1 according to a second embodiment of the present disclosure. FIG. 14A is a perspective view of the spatial position indicating device 6 being used. FIG. 14B is a schematic block diagram illustrating functional blocks of the spatial position indicating device 6. As illustrated in FIG. 14A, the spatial position indicating device 6 is usable with the electronic pen 5 inserted into the spatial position indicating device 6. The present embodiment is different from the first embodiment in that, of the functions of the electronic pen 5 described with reference to FIG. 2B, the virtual reality space input function is provided in the spatial position indicating device 6. The electronic pen 5 according to the present embodiment is a general electronic pen that does not have the virtual reality space input function. Hereinafter, the same components as those in the first embodiment will be designated by the same reference signs. The following describes details of the second embodiment, focusing on the difference between the first embodiment and the second embodiment.

Referring to FIG. 14B, the spatial position indicating device 6 functionally includes the processor 50, the communication circuit 53, the position detector 54, the switch 55, and the force sense generator 56. These basic functions are similar to those described with reference to FIG. 2B, except that the switch 55 is provided on a surface of the spatial position indicating device 6 instead of the electronic pen 5.

Referring to FIG. 14A, the spatial position indicating device 6 includes a housing 6a, a handle 6b, the position sensor 8c, which is also illustrated in FIG. 1, a bridge portion 6d, a direction indicator 6e, the abutment portion 56a, and a bridge portion 56m. The bridge portion 6d fixes the position sensor 8c to the housing 6a. The abutment portion 56a has a flat-plate shape. The bridge portion 56m is fixed so as to bridge the housing 6a. The force sense generator 56 of the spatial position indicating device 6 includes the abutment portion 56a and the bridge portion 56m.

The housing 6a is a member included in the main body of the spatial position indicating device 6 and can mount the electronic pen 5 therein. More specifically, the housing 6a has an insertion port into which the electronic pen 5 is inserted. The handle 6b is a member used by the user to hold the spatial position indicating device 6. As illustrated in FIG. 14A, the user uses the spatial position indicating device 6 with the electronic pen 5 inserted into the insertion port of the housing 6a while holding the handle 6b with one hand. The direction indicator 6e is a member for improving the usability of the user and is structured such that the right thumb can be placed thereon while the user holds the handle 6b with the right hand.

The abutment portion 56a is provided in front of the pen tip 5b via the bridge portion 56m. The abutment portion 56a is movable within an illustrated range F in the vicinity of one end of the bridge portion 56m. It is preferable that the abutment portion 56a be moved using the magnetic fluid described above. A specific position of the abutment portion 56a is determined such that the abutment portion 56a contacts the pen tip 5*b* when the abutment portion 56*a* comes closest to the electronic pen 5. When the processor 50 causes the abutment portion 56*a* to move to the right of FIG. 14A in response to the control signal received from the computer 2, the pen tip 5*b* collides with the abutment portion 56*a*. This makes the user feel the contact of the pen tip 5*b* of the electronic pen 5 with the touch surface of the virtual tablet as a real shock, as with the first embodiment.

The processing performed by the computer 2 according to the present embodiment is also basically the same as that described in the first embodiment. However, although, in the first embodiment, the computer 2 performs the process of converting the position of the position sensor 8*c* into the position of the pen tip 5*b* based on the shape of the electronic pen 5 stored in advance in the memory 2*b* at S2 of FIG. 11, the computer 2 according to the present embodiment stores in advance, in the memory 2*b*, the shape of the spatial position indicating device 6 with the electronic pen 5 inserted into the spatial position indicating device 6 and performs, based on the shape thereof, a process of converting the position of the position sensor 8*c* into the position of the pen tip 5*b*. This configuration can enable the force sense generator 56 to generate a force sense, not based on the position of the position sensor 8*c*, but based on the position of the pen tip 5*b*.

With the electronic pen 5 according to the present embodiment, as described above, the electronic pen 5 can be mounted in the spatial position indicating device 6. Therefore, the electronic pen 5 can be used in the virtual reality space.

The spatial position indicating system 1 according to the present embodiment can cause the force sense generator 56 to generate a force sense, not based on the position of the position sensor 8*c* indicated by the light reception level information, but based on the position of the pen tip 5*b*. This configuration can, therefore, cause the force sense generator 56 to generate a force sense without giving a feeling of strangeness to the user who is using the spatial position indicating device 6 and the electronic pen 5 in the virtual reality space.

Although the preferred embodiments of the present disclosure have been described above, the present disclosure is by no means limited to these embodiments. As a matter of course, the present disclosure can be implemented in various modes without departing from the scope of the present disclosure.

For example, in the above-described embodiments, the computer 2 causes the force sense generator 56 to generate a force sense when the pen tip of the electronic pen 5 has contacted the touch surface of the virtual tablet in the virtual reality space. Alternatively, the computer 2 may cause the force sense generator 56 to generate a force sense when the pen tip of the electronic pen 5 has contacted the surface of a second 3D object other than the virtual tablet. Alternatively, the computer 2 may cause the force sense generator 56 to generate a force sense, not when the contact has occurred, but when an input using the virtual reality space input function has started (that is, when the computer 2 has started generating a 3D object or when the computer 2 has started generating 3D ink data while an input to the virtual tablet is being performed).

In the example described in the second embodiment above, the force sense generator 56 includes the abutment portion 56*a*. Alternatively, the housing 6*a* or the handle 6*b* may be provided with the mechanism similar to the one given in the examples illustrated in FIGS. 6 to 8B to configure the force sense generator 56.

In the examples described in the embodiments above, the control signal for activating the force sense generator 56 is generated in the computer 2. Alternatively, this control signal may be generated in the electronic pen 5 or the spatial position indicating device 6. Hereinafter, processing performed by the processor 50 illustrated in FIG. 2B when the electronic pen 5 is configured in this manner will be described with reference to FIG. 15. The same applies to a case where the control signal is generated in the spatial position indicating device 6, except that the processor 50 illustrated in FIG. 14B performs the processing instead of the processor 50 illustrated in FIG. 2B.

Figure 15:
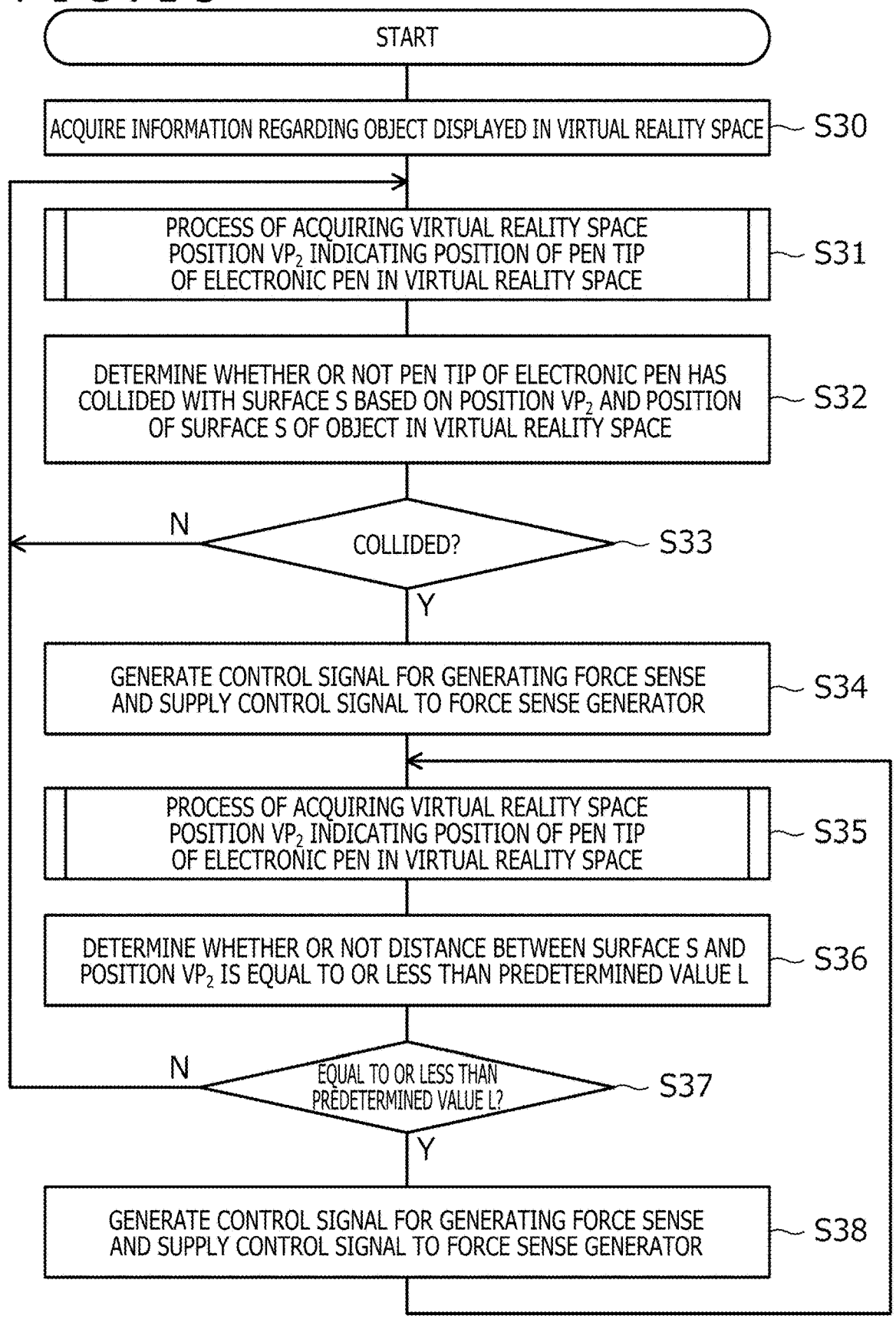
FIG. 15 is a processing flowchart illustrating processing performed by a processor illustrated in FIG. 2B.

FIG. 15 is a processing flowchart illustrating the processing performed by the processor 50 illustrated in FIG. 2B. As illustrated in FIG. 15, the processor 50 first acquires information regarding an object displayed in the virtual reality space as a premise (S30). This object is the above-described second 3D object (for example, the virtual tablet) and the processor 50 acquires the information regarding the object received from the computer 2.

Subsequently, the processor 50 performs a process of acquiring the position $VP_2$ of the pen tip 5*b* of the electronic pen 5 in the virtual reality space (S31). The details of this process are similar to those of the process described with reference to FIG. 12 and will not be described here. The processor 50 acquires light reception level information from the position detector 54 illustrated in FIG. 2B.

The processor 50, which has acquired the position $VP_2$, determines whether or not the pen tip 5*b* of the electronic pen 5 has collided with the surface S of the object (the object whose information has been acquired at S1) in the virtual reality space based on the position $VP_2$ and the position of the surface S of the object (S32 and S33). This process is similar to the process at S3 and S4 of FIG. 11.

When the processor 50 determines at S33 that the collision has occurred (Yes at S33), the processor 50 generates a control signal for generating a force sense and supplies the control signal to the force sense generator 56 illustrated in FIG. 2B (S34). This allows the user to gain an experience of collision with the surface S (for example, the touch surface of the virtual tablet).

Subsequently, the processor 50 performs the process of acquiring the virtual reality space position $VP_2$ again (S35) and determines whether or not the distance between the surface S and the position $VP_2$ is equal to or less than the predetermined value L (S36 and S37). This process is similar to the process at S7 and S8 of FIG. 11.

When the processor 50 determines at S37 that the distance is equal to or less than the predetermined value L (Yes at S37), the processor 50 generates the control signal for generating a force sense again and supplies the control signal to the force sense generator 56 illustrated in FIG. 2B (S38). Accordingly, even if the pen tip 5*b* of the electronic pen 5 leaves the surface S due to hand movement, the user can continue to feel that the pen tip 5*b* of the electronic pen 5 is in contact with the surface S as long as the pen tip 5*b* is not too far from the surface S.

The processor 50, which has completed S38, returns to S35 and continues the processing. In this manner, while the distance between the surface S and the position $VP_2$ is equal to or less than the predetermined value L (that is, while the determination result of S37 is Yes), the user can continue to feel that the pen tip 5*b* of the electronic pen 5 is in contact with the surface S.

When the processor 50 determines in S33 that the collision has not occurred (No at S33) and when the processor 50 determines at S37 that the distance is not equal to or less than the predetermined value L (No at S37), the processor 50 returns to S31 and continues the processing. In this case, since no force sense is generated by the force sense generator 56, it is possible to prevent a force sense from being generated when there is a distance between the position $VP_2$ and the surface S. This configuration can, therefore, cause the force sense generator 56 to generate a force sense without giving a feeling of strangeness to the user who is using the electronic pen 5 in the virtual reality space.

After the processor 50 acquires the virtual reality space position $VP_2$, the processor 50 may transmit the acquired virtual reality space position $VP_2$ to the computer 2. This configuration allows the computer 2 to perform S10 illustrated in FIG. 11 even when the control signal for the force sense generator 56 is generated in the electronic pen 5. Accordingly, the contact state can be maintained not only in terms of a force sense but also in terms of a visual sense.

As described with reference to FIG. 11, in addition to the event that the distance between the surface S and the position $VP_2$ is no longer equal to or less than the predetermined value L, various other events can be used as the condition for stopping the force sense generation. The same applies to the example of FIG. 15.

It is to be noted that the embodiments of the present disclosure are not limited to the foregoing embodiments, and that various changes can be made without departing from the spirit of the present disclosure.

What is claimed is:

1. A position indicating device comprising:
a housing;
a pen tip disposed at a tip of the housing;
a vibration portion disposed in a circumferential direction of the housing; and
a processor configured to control the vibration portion to vibrate in response to a control signal received from a computer,
wherein the computer is configured to control a virtual pen tip in a virtual reality space, and
wherein the control signal is generated based on a position of the virtual pen tip in the virtual reality space.

2. The position indicating device according to claim 1,
wherein the processor, in operation, controls the vibration portion to vibrate while a position of the virtual pen tip in the virtual reality space is in a predetermined state.

3. The position indicating device according to claim 1,
wherein the processor, in operation, causes the vibration portion to stop vibrating at an occurrence of a predetermined event.

4. The position indicating device according to claim 1,
wherein the vibration portion includes a magnetic fluid, and
wherein the processor, in operation, controls the vibration portion to vibrate by controlling a hardness of the magnetic fluid in response to the control signal.

5. The position indicating device according to claim 1,
wherein a position of the virtual pen tip in the virtual reality space is calculated based on a position of the pen tip in a real space.

6. A spatial position indicating system comprising:
a computer including a processor and a memory storing instructions that, when executed by the processor, cause the computer to:
acquire a position of a pen tip of a position indicating device in a real space,
acquire a position of a virtual pen tip in a virtual reality space based on the position of the pen tip in the real space, and
transmit a control signal that controls a vibration portion disposed in a circumferential direction of a housing of the position indicating device to vibrate, to the position indicating device including the vibration portion and the pen tip,
wherein the computer is configured to control the virtual pen tip in the virtual reality space, and
wherein the control signal is generated based on the position of the virtual pen tip in the virtual reality space.

7. The spatial position indicating system according to claim 6,
wherein the instructions, when executed by the processor, cause the computer to:
transmit the control signal that controls the vibration portion to the position indicating device while a position of the virtual pen tip in the virtual reality space is in a predetermined state.

8. The spatial position indicating system according to claim 6,
wherein the position indicating device causes the vibration portion to stop vibrating at an occurrence of a predetermined event.

9. The spatial position indicating system according to claim 6,
wherein the vibration portion includes a magnetic fluid, and
wherein the control signal that controls the vibration portion controls a hardness of the magnetic fluid.

10. The spatial position indicating system according to claim 9,
wherein the instructions, when executed by the processor, cause the computer to:
calculate the position of the virtual pen tip in the virtual reality space based on the position of the pen tip in the real space.

* * * * *